United States Patent [19]

van Haren et al.

[11] 4,195,855
[45] Apr. 1, 1980

[54] SEAL FOR SEALING FLANGES AND OTHER OBJECTS

[75] Inventors: Johannes G. van Haren, Naarden; Karel L. Buisman, Jutphaas, both of Netherlands

[73] Assignee: Ultra Centrifuge Nederland N.V., The Hague, Netherlands

[21] Appl. No.: 900,310

[22] Filed: Apr. 26, 1978

Related U.S. Application Data

[63] Continuation of Ser. No. 641,888, Dec. 18, 1975, abandoned.

[30] Foreign Application Priority Data

Jan. 20, 1975 [NL] Netherlands ........................ 7500619

[51] Int. Cl.² ...................... B65D 53/00; F16L 19/02
[52] U.S. Cl. ................................... 277/166; 277/211
[58] Field of Search ............ 277/209, 210, 211, 167.3, 277/167.5, 166

[56] References Cited

U.S. PATENT DOCUMENTS

| | | | |
|---|---|---|---|
| 1,731,404 | 10/1929 | Wetherill | 277/11 |
| 3,531,133 | 9/1970 | Sheeley et al. | 277/209 |
| 3,721,452 | 3/1973 | Black | 277/211 |
| 3,930,656 | 1/1976 | Jelinek | 277/166 |

FOREIGN PATENT DOCUMENTS

| | | |
|---|---|---|
| 801800 | 1/1951 | Fed. Rep. of Germany . |
| 921903 | 12/1954 | Fed. Rep. of Germany . |
| 1917326 | 10/1968 | Fed. Rep. of Germany . |
| 1274813 | 9/1961 | France . |
| 191949 | 1/1923 | United Kingdom . |

*Primary Examiner*—Robert I. Smith
*Attorney, Agent, or Firm*—Cushman, Darby & Cushman

[57] ABSTRACT

This invention deals with improvements in a seal for sealing flanges, covers and other objects, which seal consists of a combination of at least one metal annular packing and one elastic annular packing, one of them being situated concentrically about the other one, the metal packing serving mainly as a sealing member and the elastic packing serving as a backing ring.

One of the flanges is provided with a stepped recess by which the position of the seal is fully defined and by which the seal is supported laterally. In case of providing the seal in the form of two mutually spaced concentric metal packings between which the elastic packing is fitted, the stepped recess in the flange possesses an appreciably lower upright edge.

2 Claims, 4 Drawing Figures

SEAL FOR SEALING FLANGES AND OTHER OBJECTS

This is a continuation of application Ser. No. 641,888 filed Dec. 18, 1975, and now abandoned.

The invention relates to a seal for sealing flanges, covers and other objects, which seal consists of a combination of at least one metal annular packing and one elastic, for example rubber, annular packing, hereinafter called a metal packing and an elastic packing, respectively.

Such seals are known according to the British patent specification No. 1,134,096.

According to this patent specification, such a seal is used between two flanges each possessing a surface which is entirely smooth, meaning that no grooves or similar recesses are made in the flange surface. This will make it difficult, when the seal is being fitted between the flanges, to determine the proper position for the seal. Another disadvantage is that in case of contraction or jamming of the flanges which enclose the seal, the seal must be carefully prevented from becoming displaced with respect to the flanges, which might cause part of the seal to overlap the flange passages. A seal which has moved out of position furthermore has the disadvantage that the pressure applied to the seal, on account of the contraction or jamming of the flanges, is no longer distributed uniformly over that seal, which can advance the formation of leakage.

The invention aims at obviating the above disadvantage by providing one of the flanges with a stepped recess within which the seal is placed. As a result, the position of the seal with respect to the flanges and to the passage in the flanges is fully defined.

The seal according to the invention, as has been mentioned hereinabove, consists of a combination of a metal packing and an elastic packing, the latter being situated concentrically about the outside of the metal packing.

As a result, after the seal has been fitted in the stepped recess, the upright edge thereof will serve at the same time as a lateral support for the outer circumference of the elastic packing The seal is advantageously provided in the form of two mutually spaced concentric metal packings between which the elastic packing is fitted. As a result, this last packing is supported both along its outer circumference and along its inner circumference, making it possible to provide an appreciably lower upright edge for the stepped recess than is the case for the form of the seal where only one metal annular packing is used.

In the seal according to the invention, the metal packing serves mainly as a sealing member, with the elastic member serving as a backing ring. Thus, if a leakage should develop at the metal packing, the elastic packing can retain any leaking medium.

If the seal discussed hereinabove consists of a combination of a metal packing and an elastic packing, its use will prevent a medium which flows through the flange passages from leaking out. In the model where the elastic packing is fitted between two metal packings, a seal has been obtained which prevents leaking both of a medium from the inside of the flanges to the outside and of a medium from the environment of the flanges to the inside thereof.

According to another variant of the invention, the seal consists of two elastic packings which are each fitted on the openings of two concentric metal packings which, viewed in transverse section, each have a U-shaped form, which U-shaped rings are integrally connected.

The sides of the two U-shaped rings are directed oppositely to each other, so that the elastic packings fitted between these sides act as backing rings both on the upper side and on the underside of the seal.

Another embodiment of the seal according to the invention consists of three spaced, concentric metal packings, which are integrally connected by means of horizontal annular parts. Elastic packings are fitted in the annular spaces between the metal packings. This last embodiment allows an especially powerful sealing effect to be obtained: if a leak occurs in the metal packings on the outside, leaking medium will be retained by the elastic packings. However, in case there also is a leak in the elastic packings, leaking medium will be retained by the inner metal packing provided between the two other metal packings and the elastic packings.

The metal packings are made of a material which is relatively softer and more plastic than the material of the flanges. An example of a suitable material for the metal packings is aluminium.

The material of the metal packings is of a very small thickness, namely, in the order of 0.5 millimeter. It has been found in tests that when the flanges between which the seal is provided become contracted or jammed, the outer edges of such metal packings penetrate slightly into the material of the flanges, thus causing an annular groove to be formed, which optimizes the sealing effect.

The invention will be further explained on the basis of the following description of the appended figures.

Figure 1:
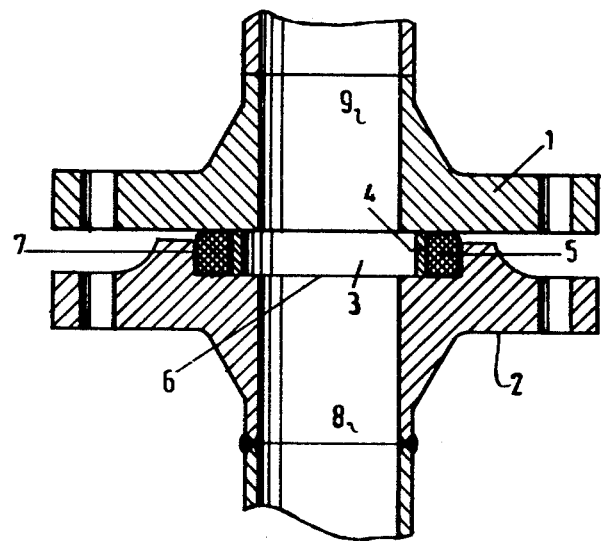
FIG. 1 is a vertical section of two flanges between which a seal according to the invention is fitted.

According to FIG. 1, the flanges 1 and 2 enclose a seal 3 which consists of an annular metal packing 4 which is surrounded by an annular elastic packing 5. The packings 4 and 5 are fitted in a stepped recess 6 provided in the flange 2. This recess 6 defines the position of the packing 4-5, while the upright edge 7 serves at the same time as a lateral support for the outer circumference of the elastic packing 5. A medium contained in the passages 8 and 9 of the flanges 1 and 2 is retained by the metal packing 4. In case of a leakage in the seal between the metal packing and one of the flanges, the elastic packing 5 will serve as a backing ring and retain any medium which may have leaked out.

Figure 2:
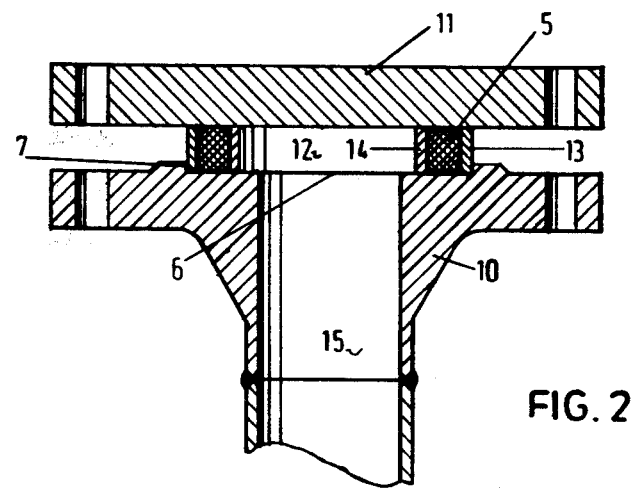
FIG. 2 is a vertical section of a flange and a cover between which a variant of the seal is fitted.

FIG. 2 shows a variant of the seal according to the invention. A flange 10 and a cover 11 enclose a seal 12 consisting of spaced, annular metal packings 13 and 14. The elastic packing 5 is fitted in the annular space between these metal packings. In this case, too, the flange 10 is provided with a stepped recess 6. Here, however, the upright edge 7 is appreciably lower than the one shown in FIG. 1, which is possible because the metal packing 13 according to this embodiment also serves as a lateral support for the outer circumference of the elastic packing 5.

Not only does the embodiment of the packing 14-5-13 shown in FIG. 2 prevent leakage of medium from the flange passage 15 to the surrounding space because of the action of the metal packing 14, it also prevents leakage of medium from the surrounding space to the flange passage 15 because of the action of the metal packing 13. In this case, too, the elastic packing 5 serves as a backing ring.

Figure 3:
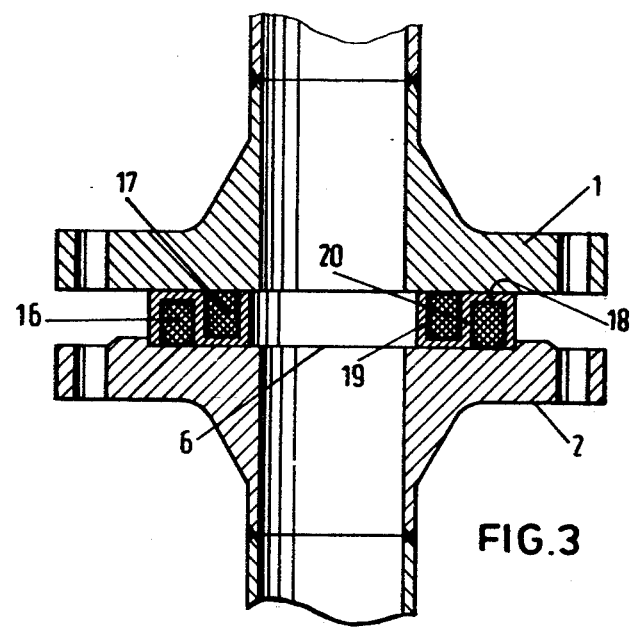
FIGS. 3 and 4 are vertical sections of two flanges between which additional variants of the seal are fitted.

FIG. 3 shows a variant of the seal in which two elastic annular packings 16 and 17 are fitted in the annular spaces formed by the metal annular packings 18 and 19. As the drawing indicates, each of the packings 18 and 19 is U-shaped in transverse section. The two metal packings are connected integrally by a common wall 20 in such a way that the two U shapes are directed oppositely to each other.

The seal in the embodiment proposed according to FIG. 3 furthermore allows the prevention of leakage of medium from the inside of the flanges 1 and 2 to the surrounding space as well as vice versa.

Figure 4:
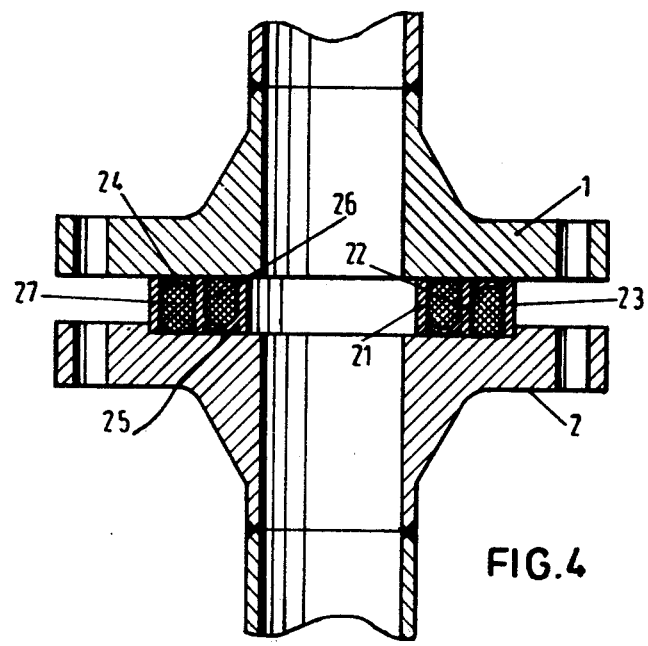

FIG. 4 finally shows a variant of the seal, again fitted between two flanges 1 and 2 and allowing an especially powerful sealing effect to be obtained. The seal here consists of three spaced, concentric metal annular packings 21, 22 and 23, which are integrally connected by horizontal annular parts 24 and 25. The annular part 24 is here provided on the upper side of the seal between the metal packings 22 and 23, while the annular part 25 is provided on the underside of the seal between the metal packings 21 and 22. Elastic packings 26 and 27 are fitted in the annular spaces between the metal packings 21 and 22 and 22 and 23, respectively. The seal can therefore be considered as a form of the oppositely directed U-shaped seal of FIG. 4. It will be evident from the following that an especially powerful sealing effect is obtained with the embodiment of the seal as shown in FIG. 4.

A medium contained inside the flanges 1 and 2 will primarily be protected by the metal packing 21 from leaking to the surrounding space. Should a leak develop on the upper side of that packing, further leakage will be prevented not only by the elastic packing 26, but by the ridges 28 and 29 metal packings 22 and 23 as well.

A similar argument applies if a leak should develop on the underside of the metal packing 21, and also if a medium from the surrounding space should tend to flow through a leak in the metal packing 23 to the inside of the flanges.

We claim:

1. In a joint between two flanges having parallel opposed sealing surfaces, a seal comprising an annular metal packing member which is soft in relation to the material of the flanges, said packing member having a shape in transverse section of two oppositely directed U-shaped rings which face toward the respective flanges and which have a common wall so as to provide between the said wall and two other, outlying walls, two annular spaces, said metal packing member having on each side three axially facing, ridged surfaces, each of said ridged surfaces being in sealing engagement with the sealing surfaces of the respective flanges, and an annular elastic backing ring in each of said spaces and engaging the sealing surface of the respective flange and the walls of the respective space, the sealing surface of one of the flanges being planar and the sealing surface of the other flange having a cylindrical recess in which said seal is fitted, said recess having an outer upright edge which engages and laterally supports the outer circumference of said seal, the height of said edge being smaller than the height of the U-shaped rings.

2. A joint as in claim 1 wherein said ridged surfaces which are in sealing engagement with the sealing surfaces of said flanges are planar and are parallel to said sealing surfaces of said flanges.

* * * * *